United States Patent
Qin et al.

(10) Patent No.: US 10,929,649 B2
(45) Date of Patent: Feb. 23, 2021

(54) MULTI-POSE FACE FEATURE POINT DETECTION METHOD BASED ON CASCADE REGRESSION

(71) Applicant: SOUTH CHINA UNIVERSITY OF TECHNOLOGY, Guangdong (CN)

(72) Inventors: Huabiao Qin, Guangdong (CN); Caiman Liao, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 122 days.

(21) Appl. No.: 16/469,647

(22) PCT Filed: Nov. 30, 2017

(86) PCT No.: PCT/CN2017/114145
§ 371 (c)(1),
(2) Date: Jun. 14, 2019

(87) PCT Pub. No.: WO2018/107979
PCT Pub. Date: Jun. 21, 2018

(65) Prior Publication Data
US 2019/0318158 A1  Oct. 17, 2019

(30) Foreign Application Priority Data
Dec. 14, 2016 (CN) .......................... 201611156174.2

(51) Int. Cl.
*G06K 9/00* (2006.01)
(52) U.S. Cl.
CPC ..... *G06K 9/00281* (2013.01); *G06K 9/00248* (2013.01)
(58) Field of Classification Search
CPC combination set(s) only.
See application file for complete search history.

(56) References Cited

U.S. PATENT DOCUMENTS

| 2014/0050358 A1* | 2/2014 | Liu | ...................... G06K 9/6209 382/103 |
| 2014/0355821 A1* | 12/2014 | Solem | ................ G06K 9/00281 382/103 |

(Continued)

FOREIGN PATENT DOCUMENTS

| CN | 104615996 | 5/2015 |
| CN | 105069430 | 11/2015 |

(Continued)

OTHER PUBLICATIONS

"International Search Report (Form PCT/ISA/210) of PCT/CN2017/114145," dated Feb. 24, 2018, with English translation thereof, pp. 1-4.

*Primary Examiner* — Tsung Yin Tsai
(74) *Attorney, Agent, or Firm* — JCIPRNET

(57) ABSTRACT

A multi-pose face feature point detection method based on cascade regression comprises: extracting a pose index features and establishing corresponding optimal weak regressors; performing corresponding initialization according to different face pose orientations; using an SIFT feature of a face image as an input feature for face orientation estimation; acquiring an orientation of an input face image according to a random forest face orientation decision tree; using a feature point mean value of a face training sample under the orientation as an initial value of the input face image feature point; and extracting the pose index feature of the face image and inputting the pose index feature into the optimal weak regressor to acquire a distribution residual to update the current feature point distribution, and complete the face feature point detection. The method can achieve a stable face feature point detection effect, and is suitable for various intelligent systems such as a face detection and recognition system, a human-computer interaction system, (Continued)

an expression recognition system, a driver fatigue detection system, and a gaze tracking system.

5 Claims, 3 Drawing Sheets

(56) References Cited

U.S. PATENT DOCUMENTS

| | | | |
|---|---|---|---|
| 2015/0169938 A1* | 6/2015 | Yao | G06K 9/00261 382/103 |
| 2016/0042223 A1* | 2/2016 | Suh | G06K 9/6296 348/156 |
| 2016/0148425 A1* | 5/2016 | Hwang | G06K 9/00281 345/419 |
| 2017/0083751 A1* | 3/2017 | Tuzel | G06K 9/00302 |
| 2018/0018503 A1* | 1/2018 | Wang | G06K 9/4671 |
| 2018/0137383 A1* | 5/2018 | Yao | G06K 9/00241 |
| 2019/0122404 A1* | 4/2019 | Freeman | G06T 7/251 |

FOREIGN PATENT DOCUMENTS

| | | |
|---|---|---|
| CN | 105787448 | 7/2016 |
| CN | 105956581 | 9/2016 |
| CN | 106682598 | 5/2017 |

* cited by examiner

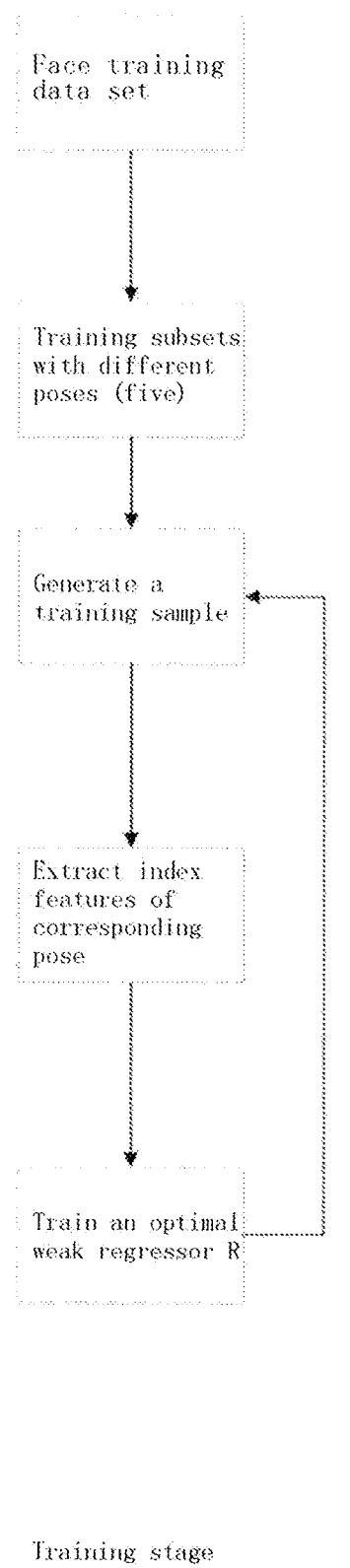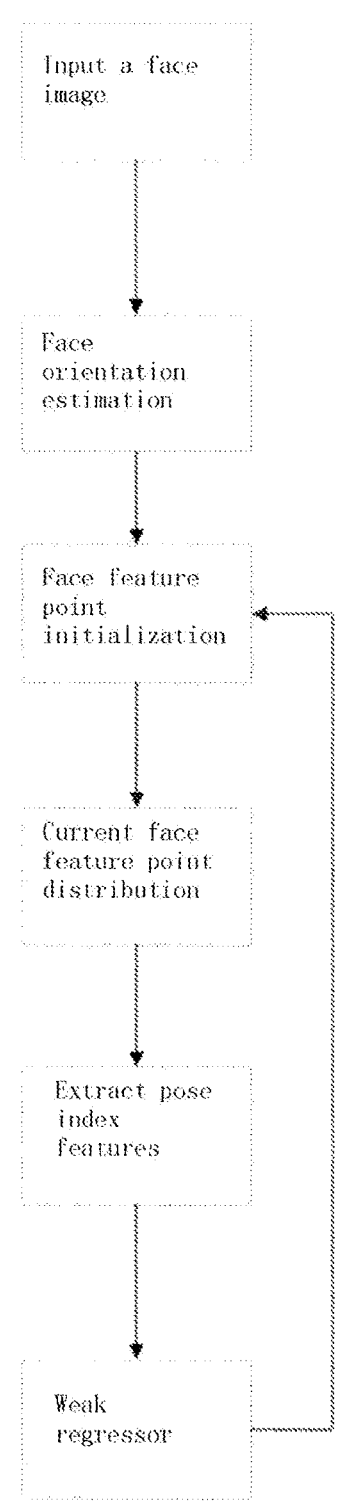
Fig. 1a
Fig. 1b

MULTI-POSE FACE FEATURE POINT DETECTION METHOD BASED ON CASCADE REGRESSION

TECHNICAL FIELD

The present invention belongs to the field of image processing and computer vision, and particularly, relates to a multi-pose face feature point detection method based on cascade regression.

BACKGROUND

Face images contain a wealth of information, and the research and analysis of face images is an important orientation and research hotspot in the field of computer vision. Face image feature point detection is the key premise of face image analysis and recognition, including application areas such as face detection and recognition, human-computer interaction, expression recognition, and eye state recognition. Therefore, the research on face feature point detection algorithms can effectively improve the overall performance of multiple systems.

There are many research directions on face images, involving many different algorithms. These methods can be roughly divided into two categories, i.e., a method based on a generative model and a method based on a discriminant model. Classic algorithms of the former include active shape model, active appearance model, etc., which mainly determine face feature points by matching input images with trained shapes or texture models, firstly determining parameters of one target shape model, and then searching for feature points that best match the model by an optimization algorithm, and using the feature points as output features. This type of method has a large amount of operations, and the shape parameters of the model require a large number of operations in each iteration. In recent years, the method based on discriminant model regression, represented by regression analysis method, no longer establishes a shape model, but directly maps the features into final required feature point coordinates through a regression equation acquired by learning after extracting features of the images, and achieves excellent results. A face feature point detection algorithm based on cascade regression adopts a form of advancing step by step from coarse to fine, acquires the corresponding shape increment by training a plurality of weak regressors, and then performs cascade regression on the weak regressors to gradually approach the real feature points.

In the method based on cascade regression, it is necessary to find a feature that is insensitive to changes in head poses for training and is sensitive to initialization results of the feature points at the same time. It is often difficult to find a pose index feature suitable for multiple poses in practical applications. Meanwhile, due to the sensitivity of the feature points to the initialization results, if the difference between the initialized position and the real position of the feature points is too large during the initialization of the feature points, the subsequent detection accuracy of the feature points will be affected. Especially when the head pose changes, the conventional face feature point initialization method cannot get a good initial position.

Therefore, it is necessary to propose an algorithm suitable for multi-pose face feature point detection and initialization to enhance the robustness of the face feature point detection algorithm.

SUMMARY

An object of the present invention is to solve the problem that the conventional face feature point detection is susceptible to changes in head poses. Corresponding weak regressors are respectively acquired by training according to training data sets with different poses. At the same time, after a new face image is input into a system, face orientation estimation is performed first, and then corresponding sample feature point mean values are selected as feature points for initialization according to the orientations, and finally the extracted pose index features are input into the weak regressors to acquire face feature points. The present invention is achieved by the following technical solutions.

A multi-pose face feature point detection method based on cascade regression comprises the following steps of:

(1) extracting pose index features and establishing corresponding optimal weak regressors: using a clustering algorithm to cluster face feature points to acquire feature point categories with adjacent positions; extracting pose index features under corresponding poses according to the feature point categories; and inputting the pose index features into a cascade regression algorithm, and training the pose index features to acquire the corresponding optimal weak regressors under different face poses; and (2) performing initialization and detection on face feature points under multi-pose changes: performing corresponding initialization according to different face pose orientations; using an SIFT feature of a face image as an input feature for face orientation estimation; acquiring an orientation of an input face image according to a random forest face orientation decision tree; using a feature point mean value of a face training sample under the orientation as an initial value of the input face image feature point; and extracting the pose index feature of the face image and inputting the pose index feature into the optimal weak regressor to acquire a distribution residual to update the current feature point distribution, and complete the face feature point detection.

Further, in the step (1), the poses are divided into different training pose subsets according to the face orientation; in each pose subset, a k-means clustering algorithm is used to cluster the same category of feature points in the internal feature points of the face, and a mean value of a clustering center is continuously updated until a sum of square errors $D = \sum_{i=1}^{k} \sum_{p \in C_i} |p - m_i|^2$ convergence, wherein C is a clustered cluster, k is a number of clusters selected according to different pose subsets, i is a face feature point, and $m_i$ is a mean value of an $i^{th}$ cluster; and finally, the internal feature points of the face are clustered into five categories: left eye, right eye, nose, mouth, and chin.

Further, in the step (1), the process of extracting the pose index features under different poses comprises: in training subsets with front face orientation, randomly selecting three types of candidate feature points from the five categories of left eye, right eye, nose, mouth and chin; in training subsets with left side face and left face orientations, randomly selecting three types of candidate feature points from the four categories of right eye, nose, mouth and chin. Similarly, in training subsets with right side face and right face orientations, randomly selecting three types of candidate feature points from the four categories of left eye, nose, mouth and chin; after selecting corresponding feature point sets, acquiring a mean value feature of a face triangular region composed of the feature point sets.

Further, the step of acquiring the mean value feature of the face triangular region comprises:

step a: acquiring local triangular region template sets: after selecting corresponding three types of candidate feature points in face training subsets with different poses, randomly selecting a feature point in each type as a vertex, and finally forming a closed triangular region by the three vertices, wherein the regions form N local region template sets L={$L_n$,n∈[1,N]};

step b: mapping reference points: mapping all templates in the set L to samples, randomly selecting a reference point Q, and determining a feature point distance by recording a distance d between the reference points and a nearest vertex Q' in the local region to complete mapping the reference points; and step c: solving the mean value feature of the local triangular region: after completely mapping the reference points, calculating the feature points, and acquiring a mean value $$B = \frac{\sum_{j=1}^{M} I(Q_j)}{M}$$

of M reference points in each closed region, wherein $I(Q_j)$ is a pixel value of a point $Q_j$ in the image; and differentiating N local region mean values in the set L in pairwise to acquire an $N^2$-dimensional local region mean value feature.

Further, in the step (2), in the face orientation estimation, the SIFT feature of the input face image is extracted as a classification feature, and input into the trained random forest decision tree, that is, a probability of each category is accumulated, and output as a category with a largest sum of predicted probabilities in all the trees, and categories with different face orientation are acquired.

Compared with the prior art, the present invention has the following advantages and effects: by introducing a multi-pose face feature point detection model, the present invention only needs to perform angle pre-classification on the face image and train different weak regressors according to different poses, and extract different pose index features for different poses, which better solves the problem of face feature point detection under multi-poses, and improves the robustness of face feature point detection.

BRIEF DESCRIPTION OF THE DRAWINGS

FIG. 1a and FIG. 1b are flow charts of a training stage and a testing stage respectively.

DETAILED DESCRIPTION

Figure 2:
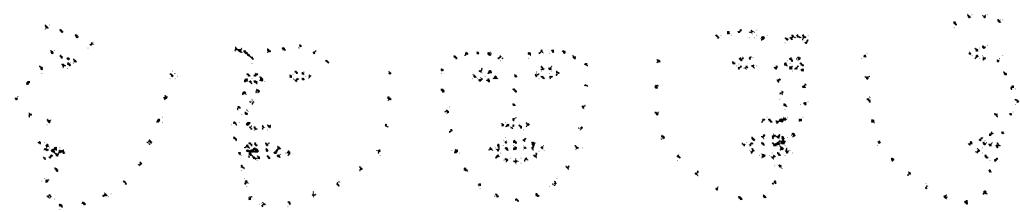
FIG. 2 is a schematic diagram of multi-pose face feature points.

The specific embodiments of the present invention will be further described below with reference to the drawings and examples, but the implementation and protection of the present invention are not limited thereto.

A multi-pose face feature point detection method based on cascade regression according to the example comprises the following steps of: dividing training samples into five pose subsets according to different head poses; extracting different pose index features for training according to different poses, and acquiring corresponding weak regressors under different poses by training; performing face orientation estimation on a newly input face image for test; selecting corresponding sample feature point mean values as feature points for initialization according to the orientations; extracting the pose index feature of the newly input face image and inputting the pose index feature into the weak regressor to acquire a distribution residual to update the current feature point distribution.

In the above method, the dividing the training samples into five pose subsets according to different head poses comprises: according to a deflection range of −90° to 90° from the angle of the face image orientation, dividing the training sample sets into five subcategories: left face (−90°, −67.5°), left side face (−67.5°, −22.5°), front face (−22.5°, 22.5°), right side face (22.5°, 67.5°), and right face (67.5°, 90°).

The extracting different pose index features for training according to different poses, and acquiring corresponding weak regressors under different poses by training comprises: dividing the face feature points into two categories, wherein one category refers to external feature points of the face, i.e., contour feature points of the face, which are sensitive to pose changes; and the other category refers to internal feature points of the face, which are composed of eyes, nose, mouth and chin, wherein the internal feature points are relatively stable in comparison with the external feature points. In the process of extracting the pose index features, the pose index features are selected from the internal feature points, different pose index features are extracted from different poses, and input into the weak regressor of random ferns to acquire the weak regressors.

The performing the face orientation estimation on the newly input face image for test comprises: estimating the face orientation of the newly input face image by using a random forest algorithm framework, extracting the SIFT feature of the face image as an input of the random forest algorithm, and acquiring an orientation category of the newly input face image at current, which belongs to one of five categories of left face, left side face, front face, right side face and right face.

The selecting the corresponding sample feature point mean values as the feature points for initialization according to the orientations comprises: after acquiring the orientation of the input face image in the method (3), correspondingly using a face feature point mean value of a training sample subset under the orientation as an initial value of the input face image feature point.

The extracting the pose index feature of the newly input face image and inputting the pose index feature into the weak regressor to acquire the distribution residual to update the current feature point distribution comprises: extracting different pose index features from different orientations according to the orientation of the input face image and inputting the pose index features into the weak regressor to acquire the distribution residual so as to update the current feature point distribution until the distribution residual is less than a certain threshold value and approximates a real face feature point distribution.

The extracting the different pose index features under different poses comprises:

step a: in the internal feature points of each pose subset, using a k-means clustering algorithm to cluster the same category of feature points in the internal feature points of the face, and continuously updating a mean value of a clustering center until a sum of square errors $D=\sum_{i=1}^{k}\sum_{p \in C_i}|p-m_i|$ convergence, wherein C is a clustered cluster, k is a number of clusters selected according to different pose subsets, i is a face feature point, and $m_i$ is a mean value of an $i^{th}$ cluster; and finally, clustering the internal feature points of the face into five categories: left eye, right eye, nose, mouth, and chin.

step b: in training subsets with front face orientation, randomly selecting three types of candidate feature points from the five categories of left eye, right eye, nose, mouth and chin; in training subsets with left side face and left face orientations, randomly selecting three types of candidate feature points from the four categories of right eye, nose, mouth and chin. Similarly, in training subsets with right side face and right face orientations, randomly selecting three types of candidate feature points from the four categories of left eye, nose, mouth and chin; after selecting corresponding feature point sets, acquiring a mean value feature of a face triangular region composed of the feature point sets.

step c: after selecting corresponding three types of candidate feature points in face training subsets with different poses, randomly selecting a feature point in each type as a vertex, and finally forming a closed triangular region by the three vertices, wherein the regions form N local region template sets $L=\{L_n, n \in [1,N]\}$;

step d: mapping all templates in the set L to samples, randomly selecting a reference point Q, and determining a feature point distance by recording a distance d between the reference points and a nearest vertex Q' in the local region to complete mapping the reference points; and after completely mapping the local regions and the reference points and acquiring the feature point mean value of each region, differentiating in pairwise to acquire an $N^2$-dimensional local region mean value feature.

In the present embodiment, the proposed multi-pose face feature point detection algorithm based on cascade regression can overcome the problem of reduced feature point detection accuracy caused by head deflection. By classifying the face poses and then using the cascade regression to train the weak regressors under the corresponding poses, during the detection process, corresponding initializations are performed according to different poses, which can improve the effect stability of the initialization. Overall flow charts of the algorithm are shown in FIG. 1a and FIG. 1b.

In the embodiment, in the training stage, all the training samples are divided into N training sample subsets. During implementation, five training subsets are divided according to a front face, a left side face, a right side face, a left face, and a right face. For any image sample I, n face feature points $(x_n, y_n)$ thereof can form a 2n*1-dimensional column vector, then a shape vector thereof can be expressed as $S=(x_1, y_1, x_2, y_2, \ldots x_n, y_n)^T$. However, every time passing through one weak regressor, an increment will be added to gradually close to a real feature point, which is $S^k=S^{k-1}+r^k(I, S^{k-1})$, wherein $r^k$ is a $k^{th}$ weak regressor, and $S^{k-1}$ is a shape vector acquired through an $(k-1)^{th}$ regressor. In the given N training sample subsets, the weak regressors are respectively acquired by training under different poses $$r^k = \arg\min_r \sum_{i=1}^{N} \|S^k - (S^{k-1} + r^k(I, S^{k-1}))\|.$$

In the implementation method, the weak regressor $r^k$ is acquired by classifying a random fern, which is a complete binary tree that classifies the training samples into category containers respectively. When a face training sample consisting of F feature groups enters the random fern, 2F category containers are acquired, and an output result of each category container is calculated from a mean estimation error of all the training samples falling into the container.

Figure 3:
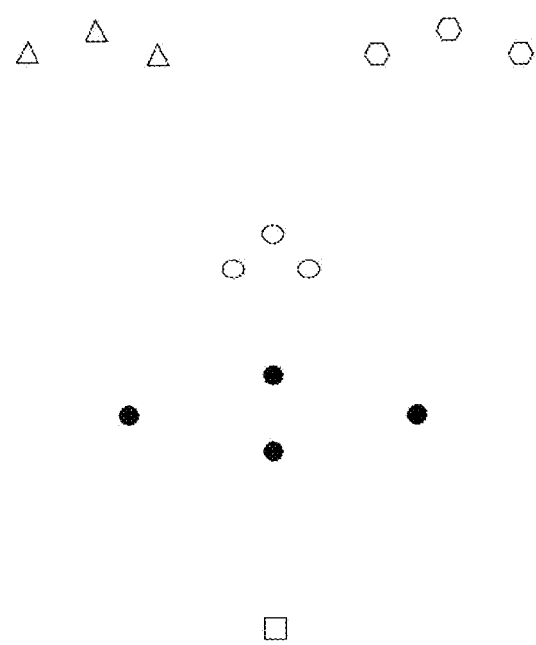
FIG. 3 is a schematic diagram of feature points inside a front face.
Figure 4:
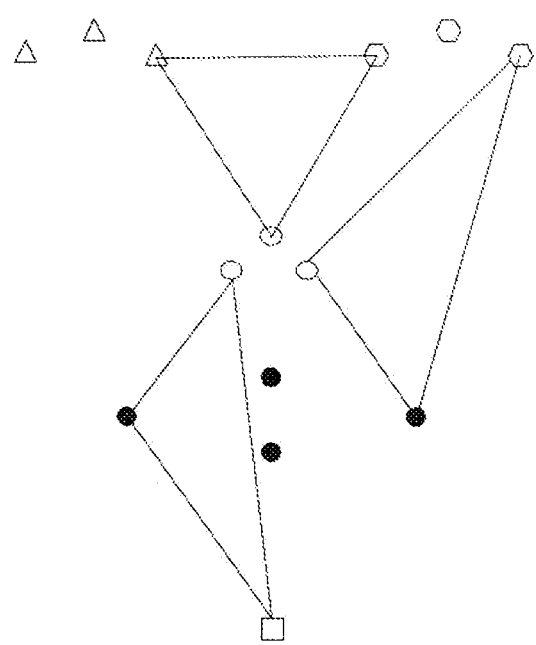
FIG. 4 is a schematic diagram of pose index features in the case of a front face.

In the embodiment, different pose index features are extracted under different poses. As shown in FIG. 2, in the five poses of the front face, the left side face, the right side face, the left face, and the right face, the face feature points are changed. In the case of the left face and the left side face, there is a certain degree of occlusion on the left face, and the feature points are changed irregularly. In the case of the right face and the right side face, there is a certain degree of occlusion on the right face. Therefore, in the case of the front face and non-front face, it is necessary to extract different pose index features according to corresponding scenes. In the case of the front face, the face feature points are as shown in FIG. 3. Firstly, a k-means clustering method is used to cluster the feature points of the same category. The feature points are divided into five categories: left eye, right eye, nose, mouth and chin. In FIG. 3, different categories are represented by different color and shape icons. In the case of the front face, three are randomly selected from the five categories. In each category, one feature point is randomly selected as a vertex of a closed triangular region, and these regions constitute a local region template set $L=\{L_n, n \in [1, N]\}$, as shown in the FIG. 4. In the case of the left face and the left side face, unstable feature points in the left eye region are proposed, and three are randomly selected from the four categories of right eye, nose, mouth, and chin. The other steps are consistent with that in the case of the front face. Similarly, in the case of the right face and the right side face, the right eye feature points are removed. After determining the local region template set, all the templates in the set L are mapped to the samples. During the process of mapping the templates, a reference point Q is randomly selected, and a feature point distance is determined by recording a distance d between the reference points and a nearest vertex O' in the local region to complete mapping the reference points. after completely mapping the reference points, the feature points are calculated, and a mean value $$B = \frac{\sum_{j=1}^{M} I(Q_j)}{M}$$

of M reference points in each closed region is acquired, wherein $I(Q_j)$ is a pixel value of a point $Q_j$ in the image; and N local region mean values in the set L are differentiated in pairwise to acquire an $N^2$-dimensional local region mean value feature.

In the implementation method, the SIFT feature of the input image needs to be extracted for performing the face orientation estimation on the newly input face image for test. An algorithm characteristic of the SIFT feature is to find extreme points in the scale space of the image, and the extreme points need to be described by gradient characteristics in various fields near the extreme points. Firstly, formation of the image can be simulated at different distances to achieve scale invariance by performing downsampling and Gaussian blur on the original image. A scale space of the face image I is defined as: $L(x,y,\sigma)=G(x,y,\sigma)*I(x,y)$, wherein $G(x,y,\sigma)$ is a scale variable Gaussian function $$G(x, y, \sigma) = \frac{1}{2\pi\sigma^2} e^{-(x^2+y^2)/2\sigma^2},$$

(x, y) are spatial coordinates, and σ is a scale coordinate. The value of σ determines the smoothness of the image. The larger the value of σ is, the larger the scale is, corresponding to the overview of the image and a low resolution condition. The smaller the value of σ is, the smaller the scale is, corresponding to the detail feature of the image, i.e., a high resolution condition. Then a key point is searched, which is generated by searching the local extreme points of the space. If a pixel point is larger or smaller than 8 pixels around the image in the same layer and is larger or smaller than the 9 adjacent points corresponding to images in two adjacent layers, then the pixel point is a local extreme point of the scale space. Finally, an orientation of the key point is calculated and acquired by a gradient histogram. The gradient histogram divides the gradient of 0 to 360 degrees into 36 parts, and a sum of gradient amplitudes in each angle is counted. The orientation with the largest value in the gradient histogram is the orientation of the key point. The SIFT feature is taken as input and input into the trained random forest to acquire the specific orientation of the face.

In the embodiment, after the specific orientation of the face is determined, the sample feature point mean values under the orientations corresponding to the front face, the left face, the left side face, the right face and the right face are respectively employed as the feature points for initialization. The method for extracting the pose index features in the testing stage is the same as that in the training stage, and the face feature point distribution of the input image is acquired through cascade of the weak regressors.

The invention claimed is:

1. A multi-pose face feature point detection method based on cascade regression, comprising the following steps of:
   (1) extracting pose index features and establishing corresponding optimal weak regressors: using a clustering algorithm to cluster face feature points to acquire feature point categories with adjacent positions; extracting pose index features under corresponding poses according to the feature point categories; and inputting the pose index features into a cascade regression algorithm, and training the pose index features to acquire the corresponding optimal weak regressors under different face poses; and
   (2) performing initialization and detection on face feature points under multi-pose changes: performing corresponding initialization according to different face pose orientations; using an SIFT feature of a face image as an input feature for face orientation estimation; acquiring an orientation of an input face image according to a random forest face orientation decision tree; using a feature point mean value of a face training sample under the orientation as an initial value of the input face image feature point; and extracting the pose index feature of the face image and inputting the pose index feature into the optimal weak regressor to acquire a distribution residual to update the current feature point distribution, and complete the face feature point detection.

2. The method according to claim 1, wherein in the step (1), the poses are divided into different training pose subsets according to the face orientation; in each pose subset, a k-means clustering algorithm is used to cluster the same category of feature points in the internal feature points of the face, and a mean value of a clustering center is continuously updated until a sum of square errors $D=[*]\Sigma_{i=1}^{k}\Sigma_{p \in C_i}|p-m_i|^2$ convergence, wherein C is a clustered cluster, k is a number of clusters selected according to different pose subsets, i is a face feature point, and $m_i$ is a mean value of an $i^{th}$ cluster; and finally, the internal feature points of the face are clustered into five categories: left eye, right eye, nose, mouth, and chin.

3. The method according to claim 1, wherein in the step (1), the process of extracting the pose index features under different poses comprises: in training subsets with front face orientation, randomly selecting three types of candidate feature points from the five categories of left eye, right eye, nose, mouth and chin; in training subsets with left side face and left face orientations, randomly selecting three types of candidate feature points from the four categories of right eye, nose, mouth and chin; similarly, in training subsets with right side face and right face orientations, randomly selecting three types of candidate feature points from the four categories of left eye, nose, mouth and chin; after selecting corresponding feature point sets, acquiring a mean value feature of a face triangular region composed of the feature point sets.

4. The method according to claim 3, wherein the step of acquiring the mean value feature of the face triangular region comprises:
   step a: acquiring local triangular region template sets: after selecting corresponding three types of candidate feature points in face training subsets with different poses, randomly selecting a feature point in each type as a vertex, and finally forming a closed triangular region by the three vertices, wherein the regions form N local region template sets $L=\{L_n, n\in[1,N]\}$;
   step b: mapping reference points: mapping all templates in the set L to samples, randomly selecting a reference point Q, and determining a feature point distance by recording a distance d between the reference points and a nearest vertex Q' in the local region to complete mapping the reference points; and
   step c: solving the mean value feature of the local triangular region: after completely mapping the reference points, calculating the feature points, and acquiring a mean value $$B = \frac{\sum_{j=1}^{M} I(Q_j)}{M}$$

of M reference points in each closed region, wherein $I(Q_j)$ is a pixel value of a point $Q_j$ in the image; and differentiating N local region mean values in the set L in pairwise to acquire an $N^2$-dimensional local region mean value feature.

5. The method according to claim 1, wherein in the step (2), in the face orientation estimation, the SIFT feature of the input face image is extracted as a classification feature, and input into the trained random forest decision tree, that is, a probability of each category is accumulated, and output as a category with a largest sum of predicted probabilities in all the trees, and categories with different face orientation are acquired.

* * * * *